(12) United States Patent
Doleyres et al.

(10) Patent No.: US 9,585,410 B2
(45) Date of Patent: Mar. 7, 2017

(54) COMPOSITION FOR PREPARATION OF A FOOD OR BEVERAGE PRODUCT

(71) Applicant: NESTEC S.A., Vevey (CH)

(72) Inventors: Yann Doleyres, Carlisle (GB); Martine Daenzer-Alloncle, Les Hopitaux Neufs (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/399,670

(22) PCT Filed: May 2, 2013

(86) PCT No.: PCT/EP2013/059105
§ 371 (c)(1),
(2) Date: Nov. 7, 2014

(87) PCT Pub. No.: WO2013/167452
PCT Pub. Date: Nov. 14, 2013

(65) Prior Publication Data
US 2015/0118380 A1    Apr. 30, 2015

(30) Foreign Application Priority Data
May 8, 2012   (EP) .................................. 12167066

(51) Int. Cl.
A23J 3/00    (2006.01)
A23C 1/00    (2006.01)
C12G 1/06    (2006.01)
A23F 5/40    (2006.01)

(52) U.S. Cl.
CPC ............... *A23F 5/40* (2013.01); *A23F 5/405* (2013.01)

(58) Field of Classification Search
CPC .................... A23F 5/40; A23F 5/405
USPC .......................................... 426/568, 470, 477
See application file for complete search history.

(56) References Cited

U.S. PATENT DOCUMENTS

2012/0156357 A1*  6/2012  Shakhin .................. A23F 5/405
                                                                426/595

FOREIGN PATENT DOCUMENTS

| GB | 2301015 | 11/1996 | |
| RU | WO 2011040832 A1 * | 4/2011 | ............ A23F 5/405 |
| WO | 2005122780 | 12/2005 | |
| WO | 2007116350 | 10/2007 | |
| WO | 2008052952 | 5/2008 | |
| WO | 2009024200 | 2/2009 | |
| WO | 2010005604 | 1/2010 | |

OTHER PUBLICATIONS

Chinese Office Action for Application No. 201380023849.4, dated Feb. 26, 2016, 11 pages.

* cited by examiner

*Primary Examiner* — Michele L Jacobson
*Assistant Examiner* — Subbalakshmi Prakash
(74) *Attorney, Agent, or Firm* — K&L Gates LLP

(57) ABSTRACT

The present invention relates to a composition for preparation of a food or beverage product. The composition comprises a foamer ingredient releasing gas upon dissolution in aqueous liquid; and a beverage or foodstuff ingredient comprising particles of ground vegetable material in a matrix comprising a vegetable extract; wherein the beverage or foodstuff ingredient has a retarded solubility such that a foam has been formed by the foamer ingredient, before the beverage or foodstuffs ingredient has dissolved, when the composition is dissolved in an aqueous liquid to produce a food or beverage product.

20 Claims, No Drawings

COMPOSITION FOR PREPARATION OF A FOOD OR BEVERAGE PRODUCT

CROSS REFERENCE TO RELATED APPLICATIONS

The present application is a National Stage of International Application No. PCT/EP2013/059105, filed on May 2, 2013, which claims priority to European Patent Application No. 12167066.5, filed May 8, 2012, the entire contents of which are being incorporated herein by reference.

FIELD OF THE INVENTION

The present invention relates to a composition for the preparation of a food or beverage product, e.g. a coffee beverage.

BACKGROUND

Soluble foamer or creamer ingredients which, upon addition of a liquid, are able to provide a creamy foam have many uses in foods and beverages. For example, these ingredients may be used to provide milk shakes and cappuccino beverages. They may also be used to generate foam in desserts, soups, and sauces.

Soluble coffee beverage powders, which produce cappuccino beverages when dissolved in water are particularly well known. Usually these products are a dry mix of a soluble coffee powder and a soluble creamer powder. The soluble beverage creamer may contain pockets of gas which, upon dissolution of the powder, produce foam. Therefore, upon the addition of water or milk (usually hot), a whitened coffee beverage, which has a foam on its upper surface, is formed; the beverage resembling, to a greater or lesser extent, traditional Italian cappuccino. Examples of these gassed soluble beverage creamers are described in European patent applications EP 0 154 192, EP 0 458 310 and EP 0 885 566. Soluble beverage creamers which contain inorganic foaming agents instead of entrapped gas are also available.

Ideally, to closely resemble a traditional Italian cappuccino, a light, fluffy, spooneable and stable foam should form on the surface of the beverage. However, quite often the foam produced by many soluble cappuccino powders is not light, fluffy and spooneable. Further, the amount of foam produced is often much less than that ordinarily found on a traditional cappuccino. The amount of foam may, to some extent, be increased by increasing the amount of soluble beverage creamer in the coffee beverage product. However this negatively influences the flavour balance of the beverage which is not always desirable.

In general, several methods exist to make a soluble coffee beverage delivering a "milk-type" foam layer upon reconstitution. Among these methods the following three deserve some further mentioning.

The first method, which is often used relates to porous coffee whitener containing gas at atmospheric pressure. Examples are found in the following patent publications U.S. Pat. No. 4,438,147 (Foaming creamer and method of making same), AU 645566 (Powdered foaming coffee whitener, process and apparatus for producing same and powdered mixture for making coffee beverages), U.S. Pat. No. 4,746,527 (Drink composition), DE 60020291 (Cappuccino creamer with improved foaming characteristics), and EP 1 064 850 (Foaming cappuccino creamer containing gasified carbohydrate). This first method comprises products, which upon reconstitution deliver a slowly forming relatively small layer of foam on top of the beverage.

The second method relates to the use of chemical foaming systems. Examples of this method are found in the following patent publications, DE 4407361 (Milk powder-free cappuccino coffee drink mixture) and EP 0 796 562 (Foaming coffee creamer and instant hot cappuccino). This second group represents a technology, which is not commonly used in the industry. The addition of chemical gassing ingredients can, but does not necessarily, lead to unpleasant taste deviations in the final beverage. In addition these type of products may be perceived by the consumer as too chemical.

The third method makes use of a foamer ingredient consisting of a porous matrix containing gas under pressure. Examples of this method are found in the following patent publications, WO 01/08504 (Foaming ingredient and powders containing it), WO 2006/023565 (Non-carbohydrate foaming compositions and methods of making the same) and WO 2006/023564 (Non-protein foaming composition and methods of making the same). The third group particularly WO 01/08504 delivers a fast developing, high amount of foam of a nice milk foam type dense and spooneable texture.

It has been found that the inclusion of particles of roast and ground coffee beans in soluble coffee products can improve the aroma of these products. Such products are e.g. disclosed in DE 19700084, GB 2022394 and WO 2010/005604. These products may e.g. be produced by introducing particles of roast and ground coffee into a liquid extract of coffee beans and drying the resulting product into a powder. Alternatively, they may be produced by simply mixing dry powders of coffee extract and roast and ground coffee particles, respectively.

SUMMARY OF THE INVENTION

The inventors have now prepared a composition of a foamer ingredient with a coffee ingredient comprising particles of roast and ground coffee beans, to obtain a product useful for preparing a cappuccino beverage with an improved aroma. They found that such a product has the disadvantage that when dissolving it in water to prepare the cappuccino beverage, some of the particles of roast and ground coffee beans are caught in the foam creating a visibly unattractive appearance. They surprisingly discovered that this problem can be eliminated or reduced by using a coffee ingredient comprising particles of roast and ground coffee beans in a matrix comprising a coffee extract, the coffee ingredient having a retarded solubility such that a foam has been formed by the foamer ingredient, before the beverage or foodstuffs ingredient has dissolved, when the composition is dissolved in an aqueous liquid.

Accordingly, the invention relates to a composition for preparing a food or beverage product, the composition comprising a foamer ingredient releasing gas upon dissolution in aqueous liquid; and a beverage or foodstuff ingredient comprising particles of ground vegetable material in a matrix comprising a vegetable extract; wherein the beverage or foodstuff ingredient has a retarded solubility such that a foam has been formed by the foamer ingredient, before the beverage or foodstuffs ingredient has dissolved, when the composition is dissolved in an aqueous liquid to produce a food or beverage product. The invention further relates to a method of preparing a beverage.

DETAILED DESCRIPTION OF THE INVENTION

A foamer ingredient according to the invention is an ingredient which when dissolved in an aqueous liquid is able to produce a foam on top of a food or beverage product. The foam may be produced by any suitable mechanism, such as e.g. by a chemical reaction between the foamer ingredient and water that produces a gas, or by release of gas held in pores in the foamer ingredient into the liquid when the foamer ingredient is dissolved.

In one embodiment of the invention, a foamer ingredient is a powder of high porosity that release air bubbles into the liquid when dissolved. Such highly porous powders may e.g. be produced by spray drying a matrix in aqueous solution after a gas has been injected into the liquid aqueous solution. Such foamer ingredients are disclosed e.g. in EP 0 458 310, U.S. Pat. No. 4,745,527 and U.S. Pat. No. 4,438,147. These foamer ingredients are in the form of a dried powder containing pores filled with gas or air. The pores are mainly open pores with free diffusion of air to the environment. A suitable foamer ingredient may also be produced from milk concentrates using technology well known in the milk powder industry. For example, a milk composition with suitable fat and protein content may be heat treated and concentrated by evaporation, e.g. to a solids content of between 40% and 60% (weight/weight) and optionally homogenised. The concentrated milk may then be gassed by injecting a gas such as atmospheric air, nitrogen or carbon dioxide into the concentrated milk. The gassed concentrated milk may then be pumped to the spray nozzle of a spray drier, e.g. at a pressure between about 2.5 MPa and 8 MPa and sprayed into hot air, e.g. air of a temperature between about 200° C. and about 400° C. to produce a dried powdered foamer ingredient.

A foamer ingredient according to the invention may preferably comprise gas enclosed under pressure. By comprising gas enclosed under pressure is meant that gas is enclosed in closed pores of the ingredient with a pressure inside the pores which is higher than ambient atmospheric pressure. This kind of foamer ingredients may be able to release volumes of gas (when measured at ambient atmospheric pressure) which are higher than what can be released by porous foamer ingredients open pores and comprising gas under ambient pressure. Such foamer ingredients and methods of producing them are disclosed in WO 01/08504, WO 2006/023565 and WO 2006/023564.

A suitable foamer ingredient comprising gas enclosed under pressure is a foamer ingredient comprising a matrix containing carbohydrate, protein and entrapped gas. The carbohydrate in the matrix may be any suitable carbohydrate or carbohydrate mixture. Suitable examples include lactose, dextrose, fructose, sucrose, maltodextrin, corn syrup, starch, modified starch, cyclodextrin, dextrose, fructose, and the like, and mixtures of these carbohydrates. Mixtures containing maltodextrin are particularly preferred. For example, the carbohydrate may be a mixture of about 40% to about 80% by weight of maltodextrin, sucrose and lactose. Sucrose preferably provides about 5% to about 30% by weight of the mixture. Lactose preferably provides about 5% to about 30% by weight of the mixture. Maltodextrin preferably provides 10% to 50% by weight of the mixture. The carbohydrate preferably provides about 40% to about 98%; more preferably about 60% to about 95% by weight of the matrix; and even more preferably about 70% to about 90% by weight. The protein in the matrix may be any suitable protein or protein mixture. The protein can be replaced by another ingredient with a similar functionality such as suitable emulsifiers. Suitable emulsifiers include monoglycerides, diglycerides, lecithin, diacetyl tartaric acid esters of mono-diglycerides (data esters), emulsifying starches and mixtures thereof. Suitable examples of protein include milk proteins (casein or whey, or both), soy proteins, wheat proteins, gelatin, caseinates, and the like. A particularly suitable source of protein is non-fat milk solids. These solids may be provided in dry or liquid form (as skimmed milk). Another suitable source of protein is sweet whey, for example in the form of sweet whey powder. Sweet whey powder usually contains a mixture of lactose and whey protein. If the protein is provided by protein source such as non-fat milk solids or sweet whey, the protein source will usually also provide some carbohydrate in the form of lactose. The matrix may contain fat as an ingredient. The fat in the matrix may be any suitable fat or fat mixture. Suitable examples include milk fat, vegetable fat and animal fat. The origin of the fat, its composition and its physical characteristics such as melting or crystallisation temperatures may influence both the foaming capacity of the soluble foamer ingredient and the stability of the foam obtained. A gas is entrapped in the matrix. The gas may be any suitable food grade gas. For example, the gas may be nitrogen, carbon dioxide or atmospheric air, and mixtures of these gases. Gases which are substantially inert are preferred. To provide the enhanced foaming, the gas is introduced into the matrix under pressure; for example at above about 100 kPa gauge. Preferably, the gas is introduced into the matrix at above about 500 kPa gauge; for example at about 1 MPa to about 20 MPa. The gas may be introduced into the matrix by any suitable process. One suitable technique involves providing the matrix in the form of expanded particles and then entrapping gas in the particles. The expanded particles may be produced by injecting a gas into an aqueous matrix concentrate having a solids content above about 30% by weight and then spray drying the concentrate to powder. The gas may be injected into the aqueous matrix concentrate at a pressure of about 500 kPa to about 5 MPa. However, the pressure at which the gas is injected into the matrix concentrate is not critical. The gassed aqueous matrix is then spray dried to powder. The particles are then subjected to an inert gas atmosphere at high pressure and at a temperature above the glass transition temperature of the particles. The pressure may be from about 100 kPa gauge to about 20 MPa gauge. The temperature needed will depend upon the composition of the particles since this will influence the glass transition temperature. However, the temperature may be readily set for any particle type by the skilled person. Temperatures more than about 50° C. above the glass transition temperature are probably best avoided. The particles may be subjected to the pressure and temperature for as long as desired since increasing the time will generally increase the gas entrapment. Usually times of about 10 seconds to about 30 minutes are sufficient. The particles are then subjected to rapid quenching or curing to ensure entrapment of the gas. Rapidly releasing the pressure may well be sufficient to quench the particles. Otherwise suitable cooling procedures may be used. Another suitable technique involves injecting gas into a molten mass of the matrix which contains little or no moisture; for example in an extruder. The gas may be injected at a pressure of about 100 kPa gauge to about 20 MPa gauge. The temperature required will depend upon the composition of the matrix since this will influence the melt temperature. However, the temperature may be readily set for any matrix by the skilled person. Generally, however, temperatures above about 150° C. should be avoided. The molten mass may then be extruded through a small orifice and comminuted into a powder. Depending upon the rapidity of solidification of the matrix, the matrix may need to be cured or quenched under pressure before being formed into a powder. This will prevent the gas from escaping from the matrix. The curing or quenching is preferably carried out rapidly but the time may vary from about 10 seconds to about 90 minutes.

A foamer ingredient according to the invention may be in any form, e.g. powder form or in the form of a tablet, cube or the like. The foamer ingredient may e.g. be as a single tablet, cube or other shape, in a suitable size to provide a single serving of the desired beverage. A suitable portioned foamer ingredient is disclosed in WO 02/062152.

A foamer ingredient may also be an ingredient that releases gas as a result of a chemical reaction when the composition of the invention is dissolved in an aqueous liquid. Such an ingredient may e.g. comprise a carbonate, e.g. sodium hydrogen carbonate, which can release gas when contacted with hot aqueous liquid, the carbonate may be combined with an acid to facilitate the reaction. Examples of this method are disclosed in DE 4407361. A foamer comprising an alkali metal carbonate of bicarbonate, e.g. potassium bicarbonate, and gluconolactone, e.g. as disclosed in EP 0 796 562, may also be used in the composition of the invention.

In one embodiment of the invention the foamer ingredient releases gas being present upon addition of liquid in an amount of at least about 1 ml, such as at least 2 ml, at least 3 ml or at least 5 ml, of gas at ambient conditions per gram of soluble foamer ingredient.

A beverage or foodstuff ingredient according to the invention is an ingredient that when dissolved or dispersed in an aqueous liquid can form the basis of a beverage or foodstuff product. A beverage or foodstuff ingredient may e.g. be soluble coffee, cocoa powder, dessert mix, soup concentrate, or the like. The beverage or foodstuff ingredient may be in any suitable form, e.g. in the form of a powder, tablet or other solid shape. The beverage or foodstuff ingredient comprises particles of a ground vegetable material in a matrix comprising a vegetable extract. Preferably the particles of ground vegetable material are dispersed in the matrix, the matrix providing a substantially continuous phase of the beverage or foodstuff ingredient, wherein the particles of ground vegetable material are dispersed as discrete elements. This may e.g. be achieved by dispersing the particles in an aqueous solution and/or dispersion of the materials of the matrix, and subsequently drying the aqueous solution to provide a solid matrix wherein the particles are dispersed. The matrix comprises a vegetable extract.

This may be an extract of any suitable vegetable, depending on the desired character and properties of the final food or beverage product to be prepared from the composition of the invention. The vegetable extract is preferably a coffee extract, produced by extracting coffee beans. The coffee beans may be raw (green) coffee beans, or they may have been roasted before extraction. Methods of extracting coffee beans are well known in the art. The matrix of the beverage or foodstuff ingredient may further comprise additional ingredients, depending on the desired characteristics of the final food or beverage product to be prepared from the composition of the invention. Additional ingredients may e.g. be aroma, flavour, sugar, or stabiliser.

If the composition if the invention is intended for the preparation of a coffee beverage, the beverage or foodstuff ingredient may preferably be a soluble, also called instant, coffee product. Such products and methods of producing them are well known in the art, e.g. from EP 0826308. A beverage or foodstuff ingredient comprising particles of a ground vegetable material in a matrix comprising a coffee extract may e.g. be produced by mixing the particles of ground vegetable material into a concentrated extract off coffee beans, and subsequently drying the coffee extract to produce a solid, e.g. powdered, product. Suitable methods of introducing particles of ground vegetable material in a matrix of coffee extract are e.g. disclosed in GB 2022394 and U.S. Pat. No. 3,261,689.

The beverage or foodstuff ingredient comprises particles of ground vegetable material. The particles may provide aroma as well as other benefits such as texture, e.g. mouthfeel and/or viscosity. The vegetable material may be any suitable vegetable material, such as e.g. coffee bean, and/or cocoa bean. The beverage or foodstuff ingredient may comprise a vegetable extract and particles of ground vegetable material originating from the same, or similar, vegetable material. E.g., if the composition of the invention is intended for the preparation of a coffee beverage, the beverage or foodstuff ingredient preferably comprises a coffee extract and particles of ground coffee bean. The particles of ground vegetable material may have any suitable size, depending on the effect desired in the final product. They may e.g. have a size that allow the particles to be visible identified in the product and/or felt in the mouth when the product is consumed, or they may have a size that makes it difficult or impossible to identify the particles visibly and/or to feel the particles in the mouth during consumption of the final food or beverage product. If the ground vegetable particles are ground coffee beans, they may preferable have an average size between about 5 μm and about 500 μm, preferably between about 50 μm and about 200 μm. In this context, average size is understood as the volume median diameter, sometimes denoted D50 or Dv50, as measured e.g. by laser diffraction size determination techniques. If the ground vegetable particles are ground coffee beans, the coffee beans may have been treated in any suitable way, the coffee beans may e.g. be roasted or raw (green) coffee beans, and may have been ground in any suitable way. Methods of grinding coffee beans are well known in the art of processing coffee.

The beverage or foodstuff ingredient of has a retarded solubility so that a foam has formed by the foamer ingredient before the beverage or foodstuffs powder has dissolved, when the composition is reconstituted with a liquid to form a beverage or foodstuff. Hereby is meant that the foamer ingredient has formed a foam covering the surface of the beverage before an amount of the beverage or foodstuff ingredient sufficient to substantially colour the foam has dissolved. In a preferred embodiment the beverage or foodstuffs powder has a solubility that is a retarded so that at least 4 millimeters, such as at least 6 millimeters, at least 8 millimeters, or at least 10 millimeters, of foam has formed by the foamer ingredient before the beverage or foodstuffs powder has dissolved, when the composition is reconstituted with a liquid to form a beverage or foodstuff. In another embodiment of the invention the beverage or foodstuffs powder has a solubility that is a retarded so that a foam has formed by the foamer ingredient (e.g. at least 4 millimeters, such as at least 6 millimeters, at least 8 millimeters, or at least 10 millimeters of foam) before the beverage or foodstuffs powder has dissolved to a degree to yield a total solids concentration of the beverage or foodstuffs powder of less than 0.40%, such as less than 0.30%, less than 0.20%, or less than 0.15%, in the liquid phase, when the composition is reconstituted with a liquid to form a beverage or foodstuff. In a further embodiment the beverage or foodstuffs powder has a solubility that is a retarded so that a foam has formed (e.g. at least 4 millimeters, such as at least 6 millimeters, at least 8 millimeters, or at least 10 millimeters of foam) by the foamer ingredient at least 2 seconds, such as at least 3 seconds, or at least 4 seconds, before 50% of the total solids of the beverage or foodstuffs powder has dissolved, when the composition is reconstituted with a liquid to form a beverage or foodstuff. In a still further embodiment the beverage or foodstuffs powder has a solubility that is a retarded so that a foam (e.g. at least 4 millimeters, such as at least 6 millimeters, at least 8 millimeters, or at least 10 millimeters of foam) has formed by the foamer ingredient before no more than 20%, such as no more than 10%, no more than 5%, or no more than 2%, of the total solids of the beverage or foodstuffs powder has dissolved, when the composition is reconstituted with a liquid to form a beverage or foodstuff.

The amount of foam being formed and the time for dissolution as well as amount of dissolved foodstuffs powder should be measured when the composition is reconstituted in a container and under conditions usual for the beverage or food in question, e.g. as recommended by the manufacturer. E.g. if the composition is a composition comprising coffee to be used to prepare a cappuccino drink, it should be reconstituted in a cup or mug as normally used for cappuccino with hot water, e.g. 80-95° C., and dosed as such a product would normally be dosed, e.g. as recommend by the manufacturer.

Conventional foodstuff and beverage ingredients intended for preparation of a foodstuff or beverage upon dissolution or dispersion in an aqueous liquid are normally prepared by methods optimising the speed of dissolution for the convenience of the consumer.

The parameters affecting solubility of such ingredients, e.g. soluble coffee powders, have therefore been studied intensively, and the skilled person will readily know which parameters affect and control the dissolution rate, e.g. parameters such as porosity and density. The retarded solubility of the foodstuff or beverage ingredient may be achieved by any suitable means. In one embodiment, the beverage or foodstuffs ingredient comprises particles coated by a coating agent which reduces the water solubility. The coating agent may e.g. be a carbohydrate (for example sucrose, fructose, maltose, dextrose, maltodextrin, lactose, coffee solids, pectin, xanthan gum and starch), a protein (for example milk solids, or gelatin) or an edible fat (for example lecithin or edible vegetable fats such as coconut fat). Carbohydrate and mixtures thereof are particularly preferred as coating agents. A liquid coffee extract may also be used as a coating agent. Particles of a foodstuff or beverage ingredient may e.g. coated by a panning process, adding e.g. carbohydrate as syrup and/or fine powder and successively drying the product. Suitable methods for coating particles of soluble coffee are disclosed e.g. in WO 97/33482 and WO 2008/052952. This process may e.g. be used to coat particles of soluble coffee with included particles of ground coffee beans. The retarded solubility may also be achieved by compacting the foodstuff or beverage ingredient. A suitable method of compacting a foodstuff or beverage ingredient, such as a soluble coffee powder, is disclosed in WO 2009/024200.

Preferably, the beverage or foodstuffs powder or ingredient dissolve in water at about 85° C. after about 2 seconds or more (time measured after immersion for 50% dissolution with a mechanical agitation at 100 rpm). In particular, it is preferred if 50% of the beverage or foodstuffs powder or ingredient dissolve in about 3 seconds to about 10 seconds.

In one preferred embodiment, the invention relates to a composition for preparing a coffee beverage, comprising a) a foamer ingredient comprising enclosed gas under pressure, releasing gas upon dissolution in aqueous liquid; and b) a coffee ingredient comprising particles of ground coffee beans, in a matrix comprising a coffee extract; wherein the beverage or foodstuff ingredient has a retarded solubility such that a foam has been formed by the foamer ingredient, before the beverage or foodstuffs ingredient has dissolved, when the composition is dissolved in an aqueous liquid to produce a food or beverage product.

The invention further relates to a method of preparing a foodstuff or beverage, the method comprising: providing a composition of the invention; and dissolving said composition in an aqueous liquid. The aqueous liquid is preferably water, milk, or a combination thereof. The aqueous liquid may be cold or hot. The method may be performed in any suitable container, e.g. in a cup or mug, and may be performed e.g. by adding the aqueous liquid into the container and then adding the composition of the invention to the liquid, or by adding the composition of the invention first to the container and then pouring the aqueous liquid into the container. The dissolution and/or dispersion of the composition of the invention in the aqueous liquid may be facilitated by gentle stirring.

EXAMPLES

Example 1 (Comparative)

A freeze dried soluble coffee powder is produced by conventional methods, except for the addition of roast and ground coffee particles. Roast and ground coffee beans are extracted with hot water, and the aqueous extract is concentrated by evaporation. Two samples are produced adding roast and ground coffee particles at two different levels (3% and 5% of total dry matter, respectively) to the concentrated coffee extract, freeze dried coffee products are produced by conventional freeze drying of the concentrated extract. The freeze dried soluble coffee powders are mixed with a powdered creamer composition comprising a foamer ingredient comprising gas under pressure as disclosed in WO 01/08504.

The final products are dissolved in 80° C. water to produce a cappuccino beverage. Both samples produce a cappuccino beverage with good foam volume but with roast and ground coffee particles clearly visible in the foam.

Example 2

A freeze dried soluble coffee powder is produced by conventional methods, except for the addition of roast and ground coffee particles. Roast and ground coffee beans are extracted with hot water, and the aqueous extract is concentrated by evaporation. Two samples are produced adding roast and ground coffee particles with two different average particle sizes (78 µm and 113 µm, respectively) at a level of 3.6% of total dry matter, to the concentrated coffee extract. Freeze dried coffee products are produced by conventional freeze drying of the concentrated extract. The freeze dried coffee powders are coated with dextrin by a panning process as described in WO 2008/052952.

The coated freeze dried soluble coffee powders are mixed with a powdered creamer composition comprising a foamer ingredient comprising gas under pressure as disclosed in WO 01/08504.

The final products are dissolved in hot water to produce a cappuccino beverage. Both samples produce a cappuccino beverage with good foam volume and foam colour and without visible roast and ground particles in the foam.

Example 3 (Comparative)

A spray dried soluble coffee powder was produced by conventional methods, except for the addition of roast and ground coffee particles. Roast and ground coffee beans were extracted with hot water, and the aqueous extract was concentrated by evaporation. Two samples were produced adding roast and ground coffee particles at two different levels (3% and 5% of total dry matter, respectively) to the concentrated coffee extract, spray dried coffee products were produced by conventional spray drying of the concentrated extract. The spray dried soluble coffee powders were mixed with a powdered creamer composition comprising a foamer ingredient comprising gas under pressure as disclosed in WO 01/08504.

The final products were dissolved in 80° C. water to produce a cappuccino beverage. Both samples produced a cappuccino beverage with good foam volume but with roast and ground coffee particles clearly visible in the foam.

Example 4

A spray dried soluble coffee powder was produced by conventional methods, except for the addition of roast and ground coffee particles. Roast and ground coffee beans were extracted with hot water, and the aqueous extract was concentrated by evaporation. Two samples were produced adding roast and ground coffee particles with two different average particle sizes (70 μm and 113 μm, respectively) at a level of 3.6% of total dry matter, to the concentrated coffee extract. Spray dried coffee products were produced by conventional spray drying of the concentrated extract. The spray dried coffee powders were coated with dextrin by a panning process as described in WO 2008/052952.

The coated spray dried soluble coffee powders were mixed with a powdered creamer composition comprising a foamer ingredient comprising gas under pressure as disclosed in WO 01/08504.

The final products were dissolved in 80° C. water to produce a cappuccino beverage. Both samples produced a cappuccino beverage with good foam volume and foam colour and without visible roast and ground particles in the foam.

The invention claimed is:

1. A composition for preparing a food or beverage product, the composition comprising:
   a foamer ingredient that releases a gas upon dissolution in an aqueous liquid; and
   a beverage or foodstuff ingredient comprising particles of a ground vegetable material in a matrix comprising a vegetable extract, wherein the beverage or foodstuff ingredient has a retarded solubility such that a foam is formed by the foamer ingredient before the beverage or foodstuff ingredient has dissolved, when the composition is dissolved in an aqueous liquid to produce the food or beverage product.

2. The composition of claim 1, wherein at least one of the foamer ingredient and the beverage or foodstuff ingredient is a powder.

3. The composition of claim 2, wherein the solubility of the beverage or foodstuff ingredient has been retarded by coating the beverage or foodstuff ingredient with a water soluble composition.

4. The composition of claim 2, wherein the beverage or foodstuff ingredient is a powder, and the solubility of the beverage or foodstuff ingredient has been retarded by compacting the powder of the beverage or foodstuff ingredient to increase a density of the powder.

5. The composition of claim 1, wherein the vegetable extract in the matrix of the beverage or foodstuff ingredient comprises a coffee and/or cocoa extract.

6. The composition of claim 1, wherein the ground vegetable material is ground coffee bean and/or ground cocoa bean.

7. The composition of claim 1, wherein the particles of the ground vegetable material have an average size between about 50 μm and about 200 μm.

8. The composition of claim 1, wherein the foamer ingredient comprises enclosed gas under pressure.

9. The composition of claim 1, wherein the foamer ingredient releases the gas upon dissolution in the aqueous liquid in an amount of at least about 1 ml of the gas at ambient conditions per gram of the foamer ingredient.

10. A method of preparing a food or beverage product, the method comprising:
    providing a composition for preparing the food or beverage product, the composition comprising (i) a foamer ingredient that releases a gas upon dissolution in an aqueous liquid and (ii) a beverage or foodstuff ingredient comprising particles of a ground vegetable material in a matrix comprising a vegetable extract, wherein the beverage or foodstuff ingredient has a retarded solubility such that a foam is formed by the foamer ingredient before the beverage or foodstuff ingredient has dissolved, when the composition is dissolved in the aqueous liquid to produce the food or beverage product; and
    dissolving the composition in the aqueous liquid.

11. The method of claim 10, wherein the aqueous liquid is selected from the group consisting of water, milk, and combinations thereof.

12. The method of claim 10, wherein the solubility of the beverage or foodstuff ingredient has been retarded by coating the beverage or foodstuff ingredient with a water soluble composition comprising a coating agent selected from the group consisting of sucrose, fructose, maltose, dextrose, maltodextrin, lactose, coffee solids, pectin, xanthan gum, starch, milk solids, gelatin, lecithin, an edible vegetable fat, and mixtures thereof.

13. The method of claim 10, wherein the foamer ingredient comprises the gas enclosed under pressure in a matrix comprising carbohydrate and protein, the carbohydrate selected from the group consisting of lactose, dextrose, fructose, sucrose, maltodextrin, corn syrup, starch, modified starch, cyclodextrin, dextrose, fructose, and mixtures thereof, and the protein selected from the group consisting of casein, whey, soy proteins, wheat proteins, gelatin, caseinates, and mixtures thereof.

14. The method of claim 13, wherein the matrix of the foamer ingredient comprises a fat selected from the group consisting of milk fat, vegetable fat, animal fat and mixtures thereof.

15. The method of claim 13, wherein the gas is selected from the group consisting of nitrogen, carbon dioxide, atmospheric air, and mixtures thereof.

16. The composition of claim 3, wherein the water soluble composition in the coating comprises a coating agent selected from the group consisting of sucrose, fructose, maltose, dextrose, maltodextrin, lactose, coffee solids, pectin, xanthan gum, starch, milk solids, gelatin, lecithin, an edible vegetable fat, and mixtures thereof.

17. A composition for preparing a food or beverage product, the composition comprising:
    a first powder comprising a foamer ingredient that releases a gas upon dissolution in an aqueous liquid; and
    a second powder comprising a beverage or foodstuff ingredient comprising particles of ground coffee bean in a matrix comprising a coffee extract, wherein the beverage or foodstuff ingredient has a solubility that has been retarded by coating with a water soluble composition comprising maltodextrin such that a foam is formed by the foamer ingredient before the beverage or foodstuff ingredient has dissolved, when the composition is dissolved in the aqueous liquid to produce the food or beverage product.

18. The composition of claim 17, wherein the foamer ingredient comprises the gas enclosed under pressure in a matrix comprising carbohydrate and protein, the carbohydrate selected from the group consisting of lactose, dextrose, fructose, sucrose, maltodextrin, corn syrup, starch, modified starch, cyclodextrin, dextrose, fructose, and mixtures thereof, and the protein selected from the group consisting of casein, whey, soy proteins, wheat proteins, gelatin, caseinates, and mixtures thereof.

19. The composition of claim 17, wherein the matrix of the foamer ingredient comprises a fat selected from the group consisting of milk fat, vegetable fat, animal fat and mixtures thereof.

20. The composition of claim 17, wherein the gas is selected from the group consisting of nitrogen, carbon dioxide, atmospheric air, and mixtures thereof.

* * * * *